(12) United States Patent
Okamura et al.

(10) Patent No.: US 8,040,083 B2
(45) Date of Patent: Oct. 18, 2011

(54) MOTOR DRIVE CONTROL SYSTEM AND METHOD FOR CONTROLLING THE SAME

(75) Inventors: Masaki Okamura, Toyota (JP); Hideaki Yaguchi, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 646 days.

(21) Appl. No.: 12/224,848

(22) PCT Filed: Mar. 16, 2007

(86) PCT No.: PCT/JP2007/056132
§ 371 (c)(1),
(2), (4) Date: Sep. 8, 2008

(87) PCT Pub. No.: WO2007/111286
PCT Pub. Date: Oct. 4, 2007

(65) Prior Publication Data
US 2009/0021198 A1    Jan. 22, 2009

(30) Foreign Application Priority Data
Mar. 24, 2006  (JP) .................................. 2006-082683

(51) Int. Cl.
*H02P 3/00* (2006.01)
*H02P 5/00* (2006.01)
(52) U.S. Cl. ....... 318/139; 318/434; 318/812; 180/65.1; 180/65.21; 180/65.225; 180/65.25
(58) Field of Classification Search ............... 318/139, 318/812, 434; 180/65.1, 65.21, 65.225, 65.25
See application file for complete search history.

(56) References Cited

U.S. PATENT DOCUMENTS

| 5,589,743 | A  | * | 12/1996 | King ................................ 318/139 |
| 6,247,437 | B1 | * | 6/2001  | Yamaguchi et al. ........ 123/179.3 |
| 6,742,487 | B2 | * | 6/2004  | Yamaguchi et al. ........ 123/179.3 |
| 7,443,116 | B2 | * | 10/2008 | Kutsuna et al. ............... 318/139 |
| 7,702,432 | B2 | * | 4/2010  | Bandai et al. ................... 701/22 |
| 2006/0052915 | A1 | | 3/2006 | Sato |

FOREIGN PATENT DOCUMENTS

| JP | A-08-182114  | 7/1996 |
| JP | A-09-070195  | 3/1997 |
| JP | A-09-215388  | 8/1997 |
| JP | A-2000-069761 | 3/2000 |
| JP | A-2003-041966 | 2/2003 |

(Continued)

*Primary Examiner* — Bentsu Ro
*Assistant Examiner* — Erick Glass
(74) *Attorney, Agent, or Firm* — Oliff & Berridge, PLC

(57) ABSTRACT

In a motor drive control system configured to include a converter capable of stepping up the voltage, when the locked state of MG2 operating as an electric motor does not occur (NO in S130), a voltage command value VHref for the converter output voltage is set according to respective required voltages of MG1 operating as an electric generator and MG2 (S140). In contrast, when the locked state of MG2 occurs (YES in S130), the voltage command value VHref is set to a limit voltage Vlmt or less for limiting the voltage step-up by the converter (S150, S180). When the locked state occurs, the converter output voltage is decreased and accordingly the DC voltage switched by the inverter is lowered, so that a switching loss at the switching device forming a part of the inverter is reduced and the temperature increase due to the heat generation can be suppressed.

18 Claims, 10 Drawing Sheets

FOREIGN PATENT DOCUMENTS

| | | |
|---|---|---|
| JP | A-2003-309997 | 10/2003 |
| JP | A-2004-064/864 | 2/2004 |
| JP | A-2004-274945 | 9/2004 |
| JP | A-2005-117758 | 4/2005 |
| JP | A-2005-253151 | 9/2005 |

* cited by examiner

MOTOR DRIVE CONTROL SYSTEM AND METHOD FOR CONTROLLING THE SAME

TECHNICAL FIELD

The present invention relates to a motor drive control system and a method for controlling the same, and more particularly to a control technique for a motor drive control system configured to include a converter configured to be able to step up an output voltage of a DC (Direct Current) power supply.

BACKGROUND ART

Generally, a motor drive control system is used that drives and controls an AC (Alternating Current) motor by converting a DC power from a DC power supply into an AC power by means of an electric power converter (typically inverter). The electric power converter such as inverter converts the power through switching at a high frequency and with a high power. Therefore, the electric converter has to be configured to avoid heat generation of a switching device (high power transistor such as IGBT: Insulated Gate Bipolar Transistor for example) performing the above-described switching operation.

In particular, while a permanent-magnet-excited synchronous motor (PM motor) or the like is driven by an electric power converter such as inverter, if the rotation of the motor is locked by any external force, the electric current concentrates on the winding of one phase only, among windings of multiple phases provided to the motor. As a result, a switching device corresponding to this phase among a plurality of switching devices provided to the electric power converter (inverter) suddenly generates heat. When such sudden heat generation occurs, the switching device could be thermally broken. Therefore, a configuration is proposed for suppressing, while the motor is locked, heat generation of the switching device forming a part of the electric power converter (inverter).

For example, Japanese Patent Laying-Open No. 9-70195 (hereinafter Patent Document 1) discloses that, while an electric motor is locked, the carrier frequency of a PWM (pulse width modulation) signal is changed from a normal frequency (10 kHz) to a low frequency (1.25 kHz) to lower the switching frequency of a switching device of an inverter and thereby reduce a switching loss, so that a sudden heat generation of each switching device of the inverter is avoided.

Further, Japanese Patent Laying-Open No. 2005-117758 (hereinafter Patent Document 2) discloses a configuration in which two drive circuits are provided in parallel for each switching device of an inverter and, while only one of the switching devices is used to render the switching device on and off in a normal operation, both of the switching devices are used to render the switching device on and off in a motor-locked state. This configuration allows the switching device to be quickly rendered on and off in the locked state so that the switching loss is reduced relative to the normal state and accordingly heat generation can be reduced.

Furthermore, Japanese Patent Laying-Open No. 9-215388 (hereinafter Patent Document 3) discloses that a locked state of a motor where a certain amount of current continuously flows is detected in an early stage based on the integral of the square of the motor drive current of each phase, so as to protect an inverter.

In contrast, a configuration that is one type of the motor drive control system is disclosed for example in Japanese Patent Laying-Open No. 2003-309997 (hereinafter Patent Document 4). In the configuration, a DC voltage from a DC power supply can be stepped up by a converter and the DC voltage which is variably controlled by the converter is converted into an AC voltage by an inverter to drive and control an AC motor. In this configuration, the amplitude of the AC voltage applied to the motor can be varied according to the operational state of the motor, so that the motor can be operated at high efficiency and high power can be obtained.

DISCLOSURE OF THE INVENTION

While the configuration disclosed in Patent Document 1 can reduce heat generation of the switching device when the motor is locked, the decreased carrier frequency deteriorates the control response and increases the noise because the switching frequency decreases to the audio frequency range.

Further, the configuration disclosed in Patent Document 2 has the problem that the size of the drive circuit as well as the cost are increased since the drive circuit used only when the motor is locked has to be additionally provided in parallel with the normally used drive circuit.

Therefore, in the case where the motor drive control system including the converter as disclosed in Patent Document 4 is to prevent heat generation of the switching device when locking of the motor is detected, preferably the control system is configured to prevent the problems as disclosed in above-described Patent Documents 1 and 2. In this respect, although Patent Document 3 discloses the reliable detection of the locked state, the document is silent about the technique for preventing heat generation of the switching device in the locked state.

The present invention has been made to solve the problems as described above, and an object of the present invention is to provide a motor drive control system configured to include a converter configured to be able to step up an output voltage of a DC power supply, and efficiently configured to suppress a temperature increase due to heat generation of each switching device forming a part of an electric converter (inverter) when the motor is locked.

A motor drive control system according to the present invention includes a DC power supply, a converter, a first inverter, voltage setting means, lock detecting means and voltage limiting means. The converter is configured to be able to step up an output voltage of the DC power supply and configured to variably control the output voltage of the DC power supply according to a voltage command value to output the output voltage to a DC power supply line. The first inverter performs electric power conversion, by means of a plurality of switching devices, between a DC power on the DC power supply line and an AC power for driving an electric motor such that the electric motor operates according to an operational command. The voltage setting means sets the voltage command value for the converter according to an operational state of the electric motor. The lock detecting means is configured to detect a locked state of the electric motor. The voltage limiting means sets the voltage command value to lower one of the voltage command value set by the voltage setting means and a predetermined limit voltage when the lock detecting means detects the locked state.

According to a method of controlling a motor drive control system of the present invention, the motor drive control system includes a DC power supply, a converter configured to be able to step up an output voltage of the DC power supply and configured to variably control the output voltage of the DC power supply according to a voltage command value to output the output voltage to a DC power supply line, and a first inverter performing electric power conversion, by means of a plurality of switching devices, between a DC power on the DC power supply line and an AC power for driving an electric motor such that the electric motor operates according to an operational command. The control method includes the steps of: setting the voltage command value for the converter according to an operational state of the electric motor; detecting a locked state of the electric motor; and limiting the voltage command value to lower one of the voltage command value that is set according to the operational state of the electric motor and a predetermined limit voltage when the locked state is detected.

In accordance with the above-described motor drive control system and the method for controlling the system, when the locked state of the electric motor is detected, the DC voltage switched by the first inverter can be decreased by setting the voltage command value such that the converter output voltage is equal to or smaller than a limit voltage. Under the condition that the torque output of the electric motor is the same, the switching loss at each switching device can be reduced to a larger extent as the DC voltage switched by the inverter is smaller. Therefore, when the locked state of the electric motor occurs, the switching loss at a switching device of a specific phase on which the electric current is concentrated in the first inverter is reduced and accordingly the temperature increase due to the heat generation can be suppressed. Further, unlike the reduction of the power loss by decreasing the switching frequency, the present invention causes no deterioration in control performance and no occurrence of audible noise, and thus no increase in size and cost due to parallel arrangement of drive circuits.

Further, since the temperature increase of the switching device is suppressed to be gentle, the torque can be output from the electric motor in the locked state for a longer period of time. Alternatively, the switching device can also be designed such that the temperature resistance of the device is low in consideration of the fact in advance that the temperature increase is made gentle when the locked state of the electric motor under severe operating conditions occurs, so as to reduce the size and cost of the switching device.

Preferably, according to the motor drive control system and the method for controlling the system of the present invention, the limit voltage is substantially equal to the output voltage of the DC power supply.

In accordance with the above-described motor drive control system and the method for controlling the system, when the locked state of the electric motor occurs, the converter is inhibited from stepping up the voltage, and accordingly the DC voltage switched by the first inverter can be set low. Therefore, the effect of suppressing the temperature increase of the switching device in the inverter (first inverter) when the locked state of the electric motor occurs can be enhanced.

Still preferably, the motor drive control system of the present invention further includes an electric generator and a second inverter. The electric generator is configured such that the electric generator can be rotationally driven by an external force. The second inverter performs electric power conversion, by means of a plurality of switching devices, between a DC power on the DC power supply line and an AC power for driving the electric generator such that the electric generator operates according to an operational command. The voltage setting means sets the voltage command value for the converter further according to an operational state of the electric generator in addition to the operational state of the electric motor. The voltage setting means includes: first setting means for calculating the voltage command value that is to be set according to the operational state of the electric motor; second setting means for calculating the voltage command value that is to be set according to the operational state of the electric generator; and third setting means for setting the voltage command value for the converter to larger one of respective voltage command values calculated by the first setting means and the second setting means.

Still preferably, according to the method for controlling the motor drive control system of the present invention, the motor drive control system further includes: an electric generator configured such that the electric generator can be rotationally driven by an external force; and a second inverter performing electric power conversion, by means of a plurality of switching devices, between a DC power on the DC power supply line and an AC power for driving the electric generator such that the electric generator operates according to an operational command. The step of setting the voltage command value includes, for setting the voltage command value for the converter further according to an operational state of the electric generator in addition to the operational state of the electric motor, a first sub step of calculating the voltage command value that is to be set according to the operational state of the electric motor; a second sub step of calculating the voltage command value that is to be set according to the operational state of the electric generator; and a third sub step of setting the voltage command value for the converter to larger one of respective voltage command values calculated by the first sub step and the second sub step.

In accordance with the above-described motor drive control system and the method for controlling the system, the electric motor and the electric generator are configured to receive the common output voltage of the converter and, when the locked state does not occur, the voltage command value for the converter output voltage can be appropriately set according to both of respective operational states of the electric motor and the electric generator. Further, when the locked state of the electric motor occurs, the output voltage of the converter is set to be the limit voltage or lower so that the temperature increase of the switching device forming a part of the inverter (first inverter) associated with the electric motor can be suppressed.

Still more preferably, the motor drive control system of the present invention further includes power generation ensuring means. The power generation ensuring means is configured to supply electric power from the electric generator to the DC power supply line when the lock detecting means detects the locked state of the electric motor.

In particular, the power generation ensuring means may be configured to set the limit voltage such that electric power can be supplied from the electric generator to the DC power supply line when the locked state of the electric motor is detected. Alternatively, the second inverter is configured to include a rectifying device connected in parallel with the plurality of switching devices each such that electric power generated by the electric generator can be directed to the DC power supply line. The power generation ensuring means may be configured to turn off the switching devices each in the second inverter and increase rotational speed of the electric generator such that an amplitude of an AC voltage induced in the electric generator is larger than a voltage on the DC power supply line, when the lock detecting means detects the locked state.

Still more preferably, the method for controlling the motor drive control system of the present invention further includes the step of ensuring power generation by the electric generator such that electric power is supplied from the electric generator to the DC power supply line when the locked state of the electric motor is detected.

In particular, the step of ensuring power generation sets the limit voltage such that electric power can be supplied from the electric generator to the DC power supply line when the locked state of the electric motor is detected. Alternatively, the second inverter may be configured to include a rectifying device connected in parallel with the plurality of switching devices each such that electric power generated by the electric generator can be directed to the DC power supply line. When the locked state of the electric motor is detected, the step of ensuring power generation turns off the switching devices each in the second inverter and increases rotational speed of the electric generator such that an amplitude of an AC voltage induced in the electric generator is larger than a voltage on the DC power supply line.

In accordance with the above-described motor drive control system and the method for controlling the system, when the locked state of the electric motor occurs, the temperature increase of the switching device in the first inverter is suppressed while the amount of electric power generated by the electric generator can be ensured. Accordingly, the effect of suppressing the temperature increase of the switching device can be utilized to ensure the time for which the locked state can be continued, namely the period of time for which the electric motor can continuously output the requested torque.

Preferably, the motor drive control system of the present invention is mounted on a vehicle, and the electric motor is configured to generate a driving force for the vehicle.

In accordance with the above-described motor drive control system and the method for controlling the system, when the locked state of the electric motor occurs in the motor drive control system driving and controlling the electric motor configured to generate the driving force for the vehicle, the temperature increase of the switching device in the inverter (first inverter) can be suppressed. In particular, the temperature increase of the switching device can be suppressed to be gentle, the electric motor in the locked state can generate the driving force for the vehicle for a longer period of time, and accordingly the vehicle performance is improved.

Still preferably, the motor drive control system of the present invention mounted on the vehicle further includes stall detecting means and operational region limiting means. The stall detecting means detects a stall state in which both of an accelerator pedal and a brake pedal of the vehicle are operated. The operational region limiting means generates, when the lock detecting means detects the locked state and the stall detecting means detects the stall state, an operational command value for the electric motor for limiting an operational region of the electric motor within a predetermined low-rotational-speed region and low-output-torque region. As for the control method, the method further includes the steps of: detecting a stall state in which both of an accelerator pedal and a brake pedal of the vehicle are operated; and generating, when the locked state of the electric motor is detected and the stall state is detected, an operational command value for the electric motor for limiting an operational region of the electric motor within a predetermined low-rotational-speed region and low-output-torque region.

In accordance with the above-described motor drive control system and the method for controlling the system, in the case where both of the stall state where both of the accelerator pedal and the brake pedal are operated and the locked state of the electric motor occur, the operational region of the electric motor is limited within a certain region where the rotational speed is low and the output torque is low, so that the driving force for the vehicle can be generated by the electric motor while the temperature increase of the switching device forming a part of the inverter (first inverter) can be suppressed and the stall start performance can be ensured.

Still preferably, the motor drive control system of the present invention is mounted on a vehicle, and the electric motor is configured to generate a driving force for the vehicle. An engine operated by combustion of fuel and a starting electric motor supplied, from the DC power supply line, with a voltage higher than the output voltage of the DC power supply, for starting the engine are further mounted on the vehicle. The motor drive control system further includes start limiting means. The start limiting means limits start of the engine when the lock detecting means detects the locked state of the electric motor. As for the control method, the method further includes the step of limiting start of the engine when the locked state of the electric motor is detected.

In accordance with the above-described motor drive control system and the method for controlling the system, in the case where the system is mounted on a hybrid vehicle including the engine and the electric motor as well as the starting electric motor starting the engine by means of the output voltage of the converter, the start of the engine is limited when the locked state of the electric motor occurs so that the increase of the converter output voltage can be limited and the temperature increase of the switching device forming a part of the inverter (first inverter) driving and controlling the electric motor can be suppressed.

Still more preferably, the motor drive control system of the present invention is mounted on a vehicle, and the electric motor is configured to generate a driving force for the vehicle. An engine operated by combustion of fuel and a starting electric motor supplied, from the DC power supply line, with a voltage higher than the output voltage of the DC power supply for starting the engine are further mounted on the vehicle. The motor drive control system further includes start ensuring means. The start ensuring means temporarily increases the voltage command value for the converter to a required voltage of the starting electric motor only within a predetermined period of time required for starting the engine, when the lock detecting means detects the locked state and the engine is instructed to start. As for the control method, the method further includes the step of temporarily increasing the voltage command value for the converter to a required voltage of the starting electric motor only within a predetermined period of time required for starting the engine, when the locked state of the electric motor is detected and the engine is instructed to start.

In accordance with the above-described motor drive control system and the method for controlling the system, in the case where the system is mounted on a hybrid vehicle including the engine and the electric motor as well as the starting electric motor starting the engine by means of the output voltage of the converter, the output voltage of the converter can be temporarily increased to the voltage required for the starting electric motor only for a predetermined period of time where the engine is instructed to start. Therefore, the engine can be started when the locked state occurs while the engine is stopping, and the voltage step-up by the converter is limited in the remaining period of time so that the temperature increase of the switching device in the inverter (first inverter) driving and controlling the electric motor can be suppressed.

Still more preferably, in the vehicle on which the motor drive control system of the present invention is mounted, the starting electric motor is formed of a motor generator configured to be able to generate electric power by being rotationally driven by at least a part of an output of the engine, when the engine is operating, and to be able to start the engine by generating a torque for rotationally driving the engine, when the engine is stopping.

In accordance with the above-described motor drive control system and the method for controlling the system, in the hybrid vehicle configured to include a single motor generator serving as both of the electric generator and the starting electric motor, the temperature increase of the switching device forming the associated inverter (first inverter) when the locked state of the electric motor occurs can be suppressed.

Accordingly, a chief advantage of the present invention is that, regarding the motor drive control configured to include the converter configured to be able to step up the output voltage of the DC power supply, the temperature increase due to heat generation of each switching device forming a part of the electric converter (inverter) when the motor is locked can be suppressed with a simple configuration without incurring deterioration of control performance and generation of audible noise.

BEST MODES FOR CARRYING OUT THE INVENTION

Figure 1:
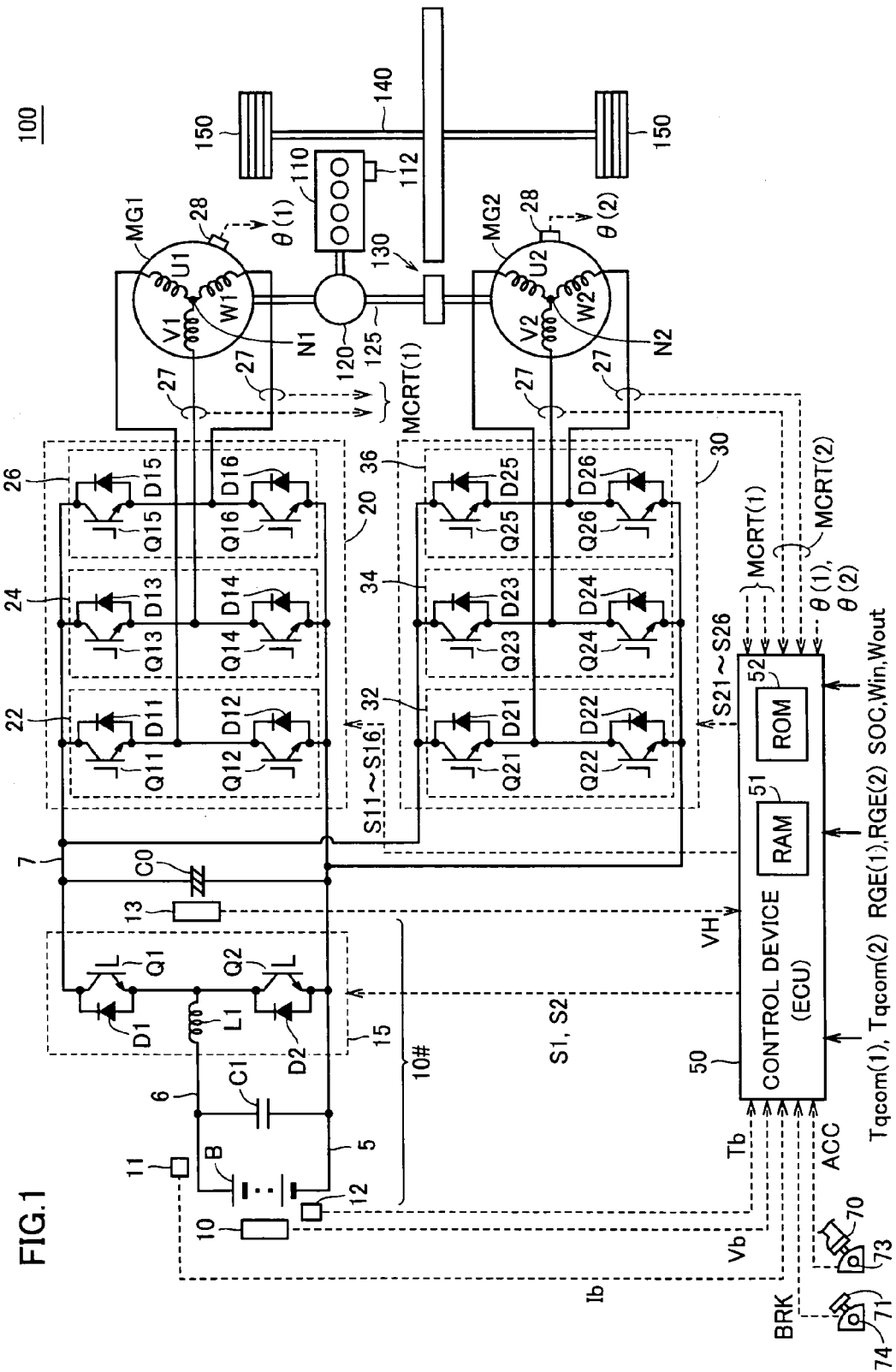
FIG. 1 is a block diagram illustrating a configuration of a hybrid vehicle shown as an example of the configuration where a motor drive control system according to an embodiment of the present invention is mounted.

In the following, embodiments of the present invention will be described in detail with reference to the drawings. Like or corresponding components in the drawings will be denoted by like reference characters and a description thereof will not be repeated in principle.

First Embodiment

FIG. 1 is a block diagram illustrating a configuration of a hybrid vehicle 100 shown as an example of the configuration where a motor drive control system according to an embodiment of the present invention is mounted.

Referring to FIG. 1, hybrid vehicle 100 includes an engine 110, a power split device 120, motor generators MG1, MG2, a reduction gear 130, a driveshaft 140, and wheels (drive wheels) 150. Hybrid vehicle 100 further includes a DC voltage generating unit 10#, a smoothing capacitor C0, inverters 20, 30, and a control device 50, for driving and controlling motor generators MG1, MG2.

Engine 110 is formed of such an internal combustion engine as gasoline engine or diesel engine. Engine 110 is provided with a coolant temperature sensor 112 detecting the temperature of a coolant. The output of coolant temperature sensor 112 is sent to control device 50.

Power split device 120 is configured to be capable of splitting the motive energy generated by engine 110 into the one transmitted through a path leading to driveshaft 140 and the one transmitted through a path leading to motor generator MG1. As power split device 120, a planetary gear train having three rotational shafts for a sun gear, a planetary gear and a ring gear respectively may be used. For example, a hollow rotor of motor generator MG1 may be used to pass the crankshaft of engine 110 through the central portion of the rotor, so that engine 110 and motor generators MG1, MG2 are mechanically connected to power split device 120. Specifically, the rotor of motor generator MG1 is connected to the sun gear, the output shaft of engine 110 is connected to the planetary gear and an output shaft 125 is connected to the ring gear. Output shaft 125 that is also connected to the rotational shaft of motor generator MG2 is connected to driveshaft 140 for rotationally driving drive wheels 150 via reduction gear 130. Here, a reduction gear for the rotational shaft of motor generator MG2 may further be included.

Motor generator MG1 is configured to have both of respective functions of an electric motor and an electric generator. Specifically, motor generator MG1 operates as the electric generator driven by engine 110 and also operates as an electric motor for starting engine 110. Specifically, motor generator MG1 corresponds to "electric generator" of the present invention, and inverter 20 connected to motor generator MG1 corresponds to "second inverter" of the present invention.

Similarly, motor generator MG2 is incorporated in hybrid vehicle 100 for generating the vehicle driving force whose output is transmitted via output shaft 125 and reduction gear 130 to driveshaft 140. Further, motor generator MG2 is configured to have both of respective functions of an electric motor and an electric generator such that the motor generator regeneratively generates electric power by generating an output torque opposite in direction to the rotational direction of wheels 150. Specifically, in hybrid vehicle 100, motor generator MG2 corresponds to "electric motor" of the present invention. Likewise, inverter 30 connected to motor generator MG2 corresponds to "first inverter" of the present invention.

A configuration for driving and controlling motor generators MG1, MG2 will now be described.

DC voltage generating unit 10# includes a running-purpose battery B for running the vehicle, a smoothing capacitor C1 and a step-up/step-down converter 15. Running-purpose battery B corresponds to "DC power supply" of the present invention and step-up/step-down converter 15 corresponds to "converter" of the present invention.

For running-purpose battery B, a secondary battery such as nickel-hydrogen or lithium-ion battery is applicable. In the present embodiment, the configuration will be described in which running-purpose battery B configured as the secondary battery is used as "DC power supply." Instead of running-purpose battery B, however, a power storage device such as electrical double layer capacitor may be applied.

A battery voltage Vb that is output from running-purpose battery B is detected by a voltage sensor 10. A battery current Ib that is input/output to/from running-purpose battery B is detected by a current sensor 11. Further, running-purpose battery B is provided with a temperature sensor 12. Since the temperature of running-purpose battery B may be locally different, some temperature sensors 12 may be provided at multiple locations respectively of running-purpose battery B. Battery voltage Vb, battery current Ib and battery temperature Tb detected respectively by voltage sensor 10, current sensor 11 and temperature sensor 12 are output to control device 50.

Smoothing capacitor C1 is connected between a ground line 5 and a power supply line 6. Between the positive terminal of running-purpose battery B and power supply line 6 and between the negative terminal of running-purpose battery B and ground line 5, a relay (not shown) that is turned on when the vehicle is operated and turned off when the vehicle operation is stopped is provided.

Step-up/step-down converter 15 includes a reactor L1 and power semiconductor devices (hereinafter "switching device") Q1, Q2 with their switching controlled. Reactor L1 is connected between a connection node of switching devices Q1, Q2 and power supply line 6. Smoothing capacitor C0 is connected between a power supply line 7 and ground line 5.

Power semiconductor switching devices Q1, Q2 are connected in series between power supply line 7 and ground line 5. The ON and OFF of power semiconductor switching devices Q1, Q2 are controlled by switching control signals S1 and S2 from control device 50.

In the embodiment of the present invention, an IGBT, power MOS (Metal Oxide Semiconductor) transistor or power bipolar transistor for example may be used as the switching device. For switching devices Q1, Q2, antiparallel diodes D1, D2 are arranged.

The DC voltage side of inverters 20 and 30 is connected via common ground line 5 and power supply line 7 to step-up/step-down converter 15. Specifically, power supply line 7 corresponds to "DC power supply line" of the present invention.

Inverter 20 is formed of a U phase arm 22, a V phase arm 24 and a W phase arm 26 provided in parallel between power supply line 7 and ground line 5. Each phase arm is formed of switching devices connected in series between power supply line 7 and ground line 5. For example, U phase arm 22 is formed of switching devices Q11, Q12, V phase arm 24 is formed of switching devices Q13, Q14 and W phase arm 26 is formed of switching devices Q15, Q16. Further, for switching devices Q11 to Q16, antiparallel diodes D11 to D16 are connected respectively. The ON and OFF of switching devices Q11 to Q16 are controlled by switching control signals S11 to S16 from control device 50.

Motor generator MG1 includes a U phase coil winding U1, a V phase coil winding V1, a W phase coil winding W1 and a rotor (not shown). Respective ends of U phase coil winding U1, V phase coil winding V1 and W phase coil winding W1 are connected to each other at a neutral point N1 and respective other ends are connected respectively to U phase arm 22, V phase arm 24 and W phase arm 26 of inverter 20. Inverter 20 performs bidirectional power conversion between DC voltage generating unit 10# and motor generator MG1 by controlling ON and OFF (switching control) of switching devices Q11 to Q16 in response to switching control signals S11 to S16 from control device 50.

Specifically, according to switching control by control device 50, inverter 20 can convert a DC voltage received from power supply line 7 into a three-phase AC voltage, and output the resultant three-phase AC voltage to motor generator MG1. Accordingly, motor generator MG1 is driven to generate a designated torque. Further, inverter 20 can also convert a three-phase AC voltage generated by motor generator MG1 by receiving the output of engine 110, into a DC voltage, according to switching control by control device 50, and output the resultant DC voltage to power supply line 7.

Inverter 30 is configured similarly to inverter 20. Specifically, inverter 30 is configured to include switching devices Q21 to Q26 whose ON and OFF are controlled by switching control signals S21 to S26 as well as antiparallel diodes D21 to D26.

Motor generator MG2 is configured similarly to motor generator MG1 to include a U phase coil winding U2 provided to a stator, a V phase coil winding V2, a W phase coil winding W2, and a rotor (not shown). Like motor generator MG1, respective ends of U phase coil winding U2, V phase coil winding V2 and W phase coil winding W2 are connected to each other at a neutral point N2 and respective other ends are connected respectively to a U phase arm 32, a V phase arm 34 and a W phase arm 36 of inverter 30.

Inverter 30 performs bidirectional power conversion between DC voltage generating unit 10# and motor generator MG2 by controlling ON and OFF (switching control) of switching devices Q21 to Q26 in response to switching control signals S21 to S26 from control device 50.

Specifically, inverter 30 can convert a DC voltage received from power supply line 7 into a three-phase AC voltage according to switching control by control device 50, and output the resultant three-phase AC voltage to motor generator MG2. Accordingly, motor generator MG2 is driven to generate a designated torque. Further, when the vehicle is regeneratively braked, inverter 30 can convert a three-phase AC voltage generated by motor generator MG2 receiving the rotational force from wheels 150, into a DC voltage, according to switching control by control device 50, and output the resultant DC voltage to power supply line 7.

Regenerative braking here includes braking accompanied by regenerative power generation when a driver operating the hybrid vehicle steps on the foot brake, as well as deceleration (or stop of acceleration) of the vehicle accompanied by regenerative power generation when the driver releases the accelerator pedal without operating the foot brake.

Motor generators MG1, MG2 are each provided with a current sensor 27 and a rotational angle sensor (resolver) 28. Since the sum of respective instantaneous values of three-phase currents iu, iv, iw is zero, it is sufficient that current sensor 27 are arranged to detect respective motor currents corresponding to two phases (v phase current iv and w phase current iw for example) as shown in FIG. 1. Rotational angle sensor 28 detects a rotational angle θ of the rotor (not shown) of motor generators MG1, MG2, and sends detected rotational angle θ to control device 50. Control device 50 can calculate revolution number Nmt (rotational angular velocity ω) of motor generators MG1, MG2, based on rotational angle θ.

Motor current MCRT (1) and rotor rotational angle θ (1) of motor generator MG1 as well as motor current MCRT (2) and rotor rotational angle θ (2) of motor generator MG2 that are detected by these sensors are input to control device 50. Control device 50 receives, as motor commands, torque command value Tqcom (1) and control signal RGE (1) indicating the regenerative operation concerning motor generator MG1 as well as torque command value Tqcom (2) and control signal RGE (2) indicating the regenerative operation concerning motor generator MG2.

Control device 50 formed of an electronic control unit (ECU) is configured to include a microcomputer (not shown), a RAM (Random Access Memory) 51 and a ROM (Read Only Memory) 52, and follows a predetermined program process to generate switching control signals S1, S2 (voltage step-up/step-down converter 15), S11-S16 (inverter 20) and S21-S26 (inverter 30) for controlling switching of voltage step-up/step-down converter 15 and inverters 20, 30, so that motor generators MG1, MG2 operate according to motor commands that are input from the higher-order electronic control unit (ECU).

Further, to control device 50, information concerning running-purpose battery B, such as the state of charge (SOC) as well as input/output available electric power quantities Win, Wout indicating the limit of charge/discharge, is input. Accordingly, control device 50 has the function of restricting the power consumption and the generated power (regenerative power) of motor generators MG1, MG2 as required, so that overcharge or overdischarge of running-purpose battery B does not occur.

In the present embodiment, the description has been given of the mechanism where a single control device (ECU) 50 is used to change the switching frequency for the inverter control. A similar control configuration, however, may be implemented through coordinated operation of a plurality of control devices (ECUs).

It is well known that instructions to accelerate and decelerate/stop hybrid vehicle 100 from the driver are input through operation of an accelerator pedal 70 and a brake pedal 71. The driver's operation (the extent to which the pedal is depressed) of accelerator pedal 70 and brake pedal 71 is detected by an accelerator pedal depression sensor 73 and a brake pedal depression sensor 74. Accelerator pedal depression sensor 73 and brake pedal depression sensor 74 output respective voltages according to respective depressions of accelerator pedal 70 and brake pedal 71 by the driver.

Output signals ACC and BRK indicative of respective depressions of accelerator pedal depression sensor 73 and brake pedal depression sensor 74 are input to control device 50. In the case where only the detection of the stall state where both of accelerator pedal 70 and brake pedal 71 are operated is taken into consideration, the signals may be not only the signals indicating respective depressions of accelerator pedal 70 and brake pedal 71 but a flag signal indicating whether or not the driver depresses the pedal (whether or not the depression≠0).

Next, a description will be given of the operation of voltage step-up/step-down converter 15 and inverters 20, 30 for driving and controlling motor generators MG1, MG2.

In the case of the voltage step-up operation by voltage step-up/step-down converter 15, control device 50 sets command value VHref for system voltage VH (the command value will also be simply referred to as voltage command value VHref hereinafter) according to the operational state of motor generators MG1, MG2 and, based on voltage command value VHref and the detected value of system voltage VH by voltage sensor 13, generates switching control signals S1, S2 so that the output voltage of voltage step-up/step-down converter 15 is equal to voltage command value VHref.

When voltage step-up/step-down converter 15 performs the voltage step-up operation, voltage step-up/step-down converter 15 outputs, commonly to inverters 20, 30, DC voltage VH (the DC voltage corresponding to the input voltage to inverters 20, 30 will also be referred to as "system voltage VH" hereinafter) generated by stepping up DC voltage (battery voltage) Vb supplied from running-purpose battery B. More specifically, in response to switching control signals S1, S2 from control device 50, the duty ratio (the ratio of the ON period) of switching devices Q1, Q2 which are turned on and off alternately is set, and thus the voltage step-up ratio is determined according to the duty ratio.

Further, when voltage step-up/step-down converter 15 performs the voltage step-down operation, voltage step-up/step-down converter 15 steps down a DC voltage (system voltage) supplied from inverters 20, 30 via smoothing capacitor C0 to charge running-purpose battery B. More specifically, a period in which only switching device Q1 is kept ON and a period in which both of switching devices Q1, Q2 are kept OFF in response to switching control signals S1, S2 from control device 50 are alternately provided, and thus the voltage step-down ratio is determined according to the duty ratio of the above-described ON period.

Smoothing capacitor C0 smoothes the DC voltage (system voltage) from voltage step-up/step-down converter 15 and supplies the smoothed DC voltage to inverters 20, 30. Voltage sensor 13 detects the terminal-to-terminal voltage of smoothing capacitor C0, namely system voltage VH, and outputs the detected value to control device 50.

In the case where a torque command value for associated motor generator MG2 is positive (Tqcom (2)>0), inverter 30 converts the DC voltage supplied from smoothing capacitor C0 into an AC voltage through ON and OFF operation (switching operation) of switching devices Q21 to Q26 in response to switching control signals S21 to S26 from control device 50, and drives motor generator MG2 so that a positive torque is output. Further, in the case where the torque command value for motor generator MG2 is zero (Tqcom (2)=0), inverter 30 converts the DC voltage into the AC voltage by the switching operation in response to switching control signals S21 to S26, and drives motor generator MG2 so that the torque is zero. Thus, motor generator MG2 is driven to generate the zero or positive torque as designated by torque command value Tqcom (2).

In the case where the hybrid vehicle is regeneratively braked, the torque command value for motor generator MG2 is set to a negative value (Tqcom (2)<0). In this case, inverter 30 converts the AC voltage generated by motor generator MG2 into a DC voltage through switching operation in response to switching control signals S21 to S26, and supplies the DC voltage (system voltage) resultant from the conversion to voltage step-up/step-down converter 15 via smoothing capacitor C0.

In this way, inverter 30 performs the electric power conversion so that motor generator MG2 operates according to the command value, by means of the ON and OFF control of switching devices Q21 to Q26 according to switching signals S21 to S26 from control device 50. Inverter 20 performs the electric power conversion so that motor generator MG1 operates according to the command value, by means of the ON and OFF control of switching devices Q11 to Q16 according to switching signals S11 to S16, like the operation of inverter 30 as described above.

In this way, control device 50 drives and controls motor generators MG1, MG2 according to torque command values Tqcom (1), (2). Accordingly, in hybrid vehicle 100, the generation of the vehicle driving force through power consumption by motor generator MG2, the generation of charging power for running-purpose battery B or consumed power by motor generator MG2 through power generation by motor generator MG1, and the generation of charging power for running-purpose battery B through the regenerative braking operation (power generation) by motor generator MG2, can be appropriately performed according to the operational state of the vehicle.

Figure 2:
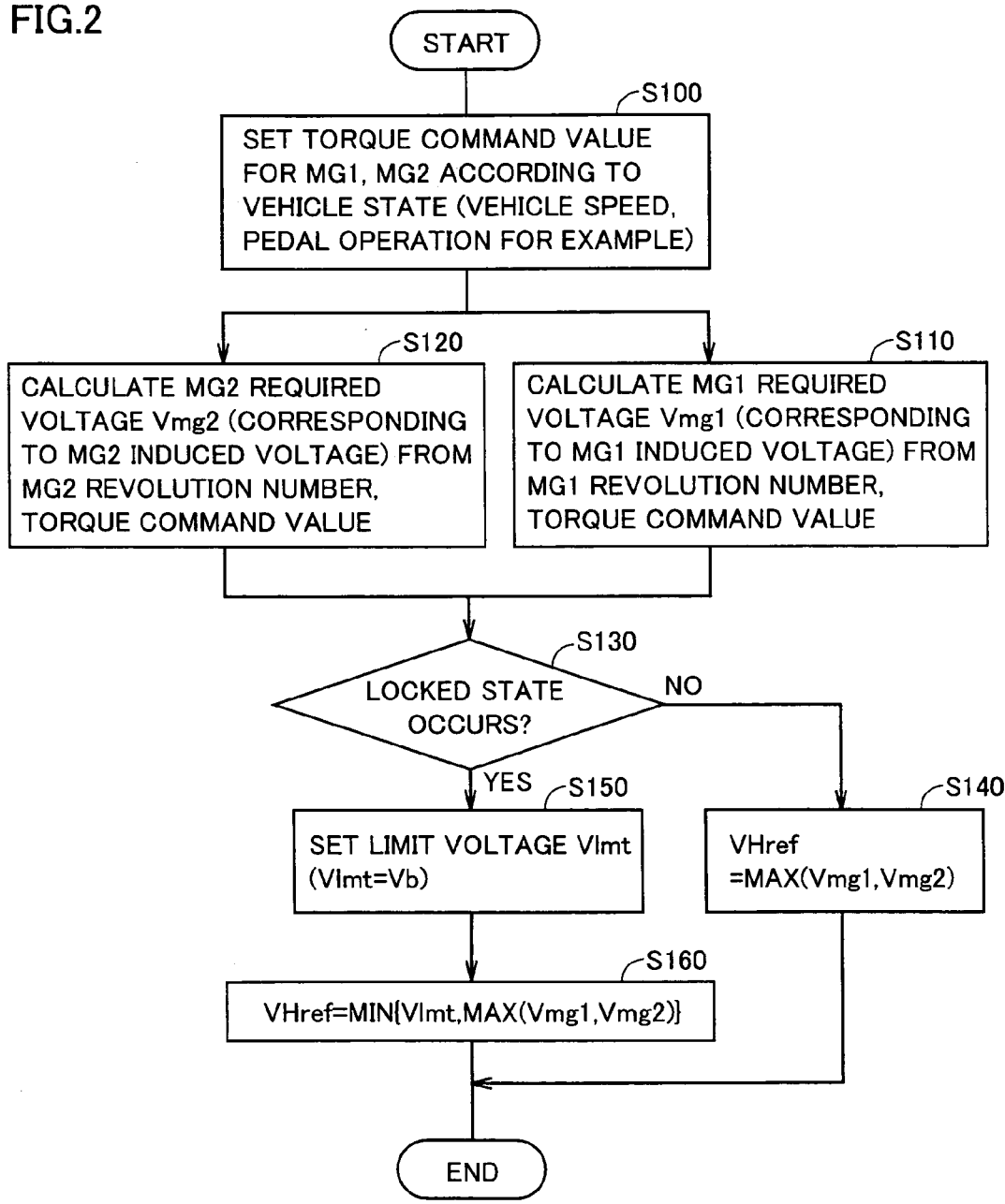
FIG. 2 is a flowchart illustrating setting of a voltage command value for a voltage step-up/step-down converter according to a first embodiment of the present invention.

FIG. 2 is a flowchart illustrating the setting of voltage command value VHref for voltage step-up/step-down converter 15 in the first embodiment of the present invention. Here, a program following the flowchart shown in FIG. 2 is stored in ROM 52 in control device 50, and is executed in predetermined cycles by control device 50.

Referring to FIG. 2, in step S100, control device 50 sets torque command values Tqcom (1) and Tqcom (2) for motor generators MG1 and MG2 according to the vehicle state (such as vehicle speed and operation of the pedal for example).

Further, in step S110, control device 50 calculates required voltage Vmg1 in association with an induced voltage of motor generator MG1, according to the revolution number and torque command value Tqcom (1) of motor generator MG1. Similarly, in step S120, control device 50 calculates required voltage Vmg2 in association with an induced voltage of motor generator MG2, according to the revolution number and torque command value Tqcom (2) of motor generator MG2.

Here, in motor generator MG (MG1 and MG2 are collectively referred to as MG, this is applied as well to the following description), as the revolution number and/or torque increases, the counter electromotive force increases so that the induced voltage increases. Here, in the embodiments of the present invention, the term "revolution number" refers to the number of revolutions per unit time (typically per minute) unless otherwise specified. When the induced voltage increases to become higher than the DC side voltage of the inverter, namely system voltage VH, the current cannot be supplied from the DC side to the AC side of the inverter. Therefore, the motor generator cannot be controlled by inverter 20 or 30. Accordingly, in steps S110 and S120, required voltages Vmg1 and Vmg2 are set to be equal to or higher than respective induced voltages of motor generators MG1 and MG2.

Figure 3:
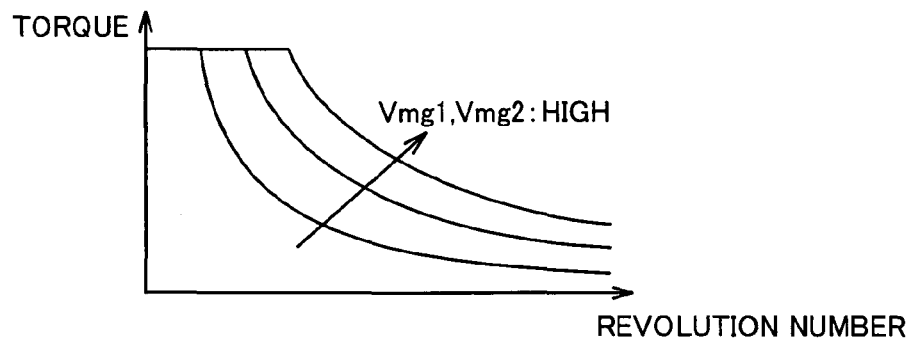
FIG. 3 is a first schematic diagram illustrating a relation between an operational state of a motor generator and a required voltage.
Figure 4:
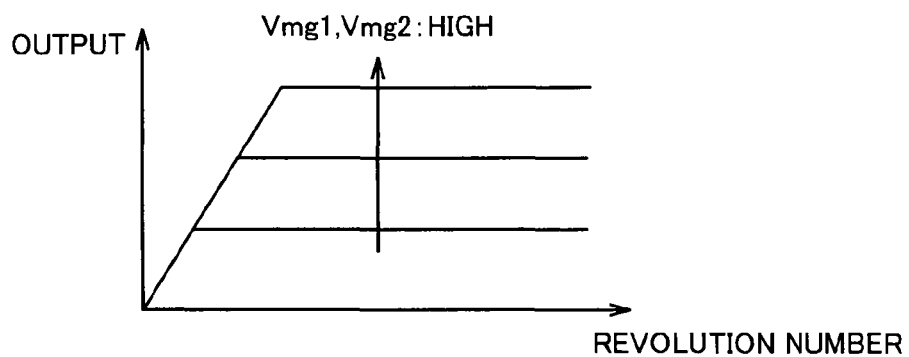
FIG. 4 is a second schematic diagram illustrating a relation between an operational state of a motor generator and a required voltage.

Specifically, as shown in FIG. 3, according to the torque and the revolution number of motor generator MG, more particularly as the region of the revolution number and the torque is a higher revolution number and higher torque region, required voltages Vmg1 and Vmg2 are set relatively higher. Further, as shown in FIG. 4, required voltages Vmg1 and Vmg2 are basically determined by the required output of motor generator MG (revolution number×torque). Further, for the same revolution number, required voltages Vmg1 and Vmg2 are set relatively higher as the output increases.

Figure 5:
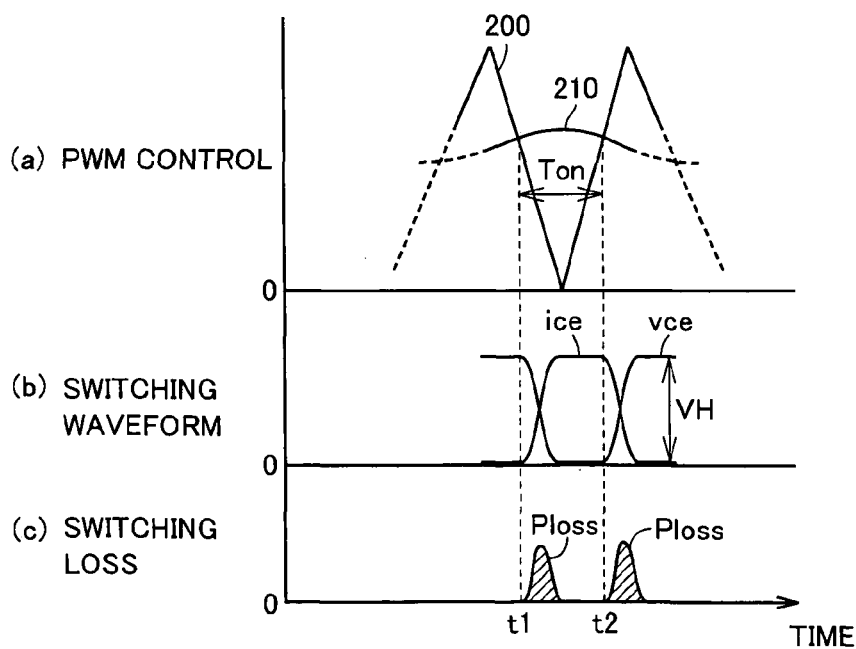
FIG. 5 is a waveform chart illustrating a switching loss occurring at each switching device in an inverter.

Here, FIG. 5 is used to illustrate a switching loss occurring at each switching device of inverters 20, 30.

Referring to FIG. 5, the switching operation of each switching device in inverters 20, 30 is set according to pulse width modulation control (PWM control). Specifically, as shown in FIG. 5(a), the PWM control controls the ON and OFF of the switching device of each phase arm in inverters 20, 30 based on a voltage comparison between a predetermined carrier wave 200 and a voltage command wave 210. Here, carrier wave 200 is generally triangular wave or saw tooth wave with a predetermined frequency. Voltage command wave 210 represents an applied voltage (AC voltage) to the motor generator for generating each phase current required for operating motor generator MG according to torque command value Tqcom. The ON and OFF of the switching devices forming the same phase arm are changed depending on whether the carrier wave is a higher voltage than the voltage command wave or not. FIG. 5 shows an example of the switching waveform of the switching device that is turned on when the voltage command wave is a higher voltage than the carrier wave and turned off otherwise.

As shown in FIG. 5(b), when the switching device is ON, the collector to emitter voltage is vce=0 while the collector to emitter current ice is generated. In contrast, when the switching device is OFF, the collector to emitter current is ice=0 while the collector to emitter voltage is vce=VH. Here, when the switching device is rendered ON/OFF, in the period until the switching device is completely rendered ON or OFF, namely the period until the collector to emitter voltage changes to vce=0 or the collector to emitter current changes to ice=0, switching loss Ploss (Ploss=vce·ice) is generated that corresponds to the product of collector to emitter voltage vce and collector to emitter current ice as shown in FIG. 5(c). The occurrence of this switching loss Ploss causes the switching device to generate heat and thus the temperature of the switching device increases.

Here, the amplitude of the collector to emitter voltage vce corresponds to system voltage VH, and the collector to emitter current ice is a current according to the current supplied to motor generator MG. Therefore, when the same torque is output, namely under the same torque command value, a higher system voltage VH causes a larger switching loss Ploss.

Therefore, in the first embodiment, voltage command value VHref is set as described below when the electric motor (motor generator MG2) is locked, so as to suppress the temperature increase of the switching device in inverter 30.

Referring again to FIG. 2, control device 50 determines in step S130 whether or not a locked state of motor generator MG2 occurs. The locked state refers to the state, while the vehicle is going up a hill, for example, where the revolution number of motor generator MG2 is extremely low (substantially zero) regardless of the fact that a certain current or more is supplied to motor generator MG2 according to torque command value Tqcom (2). In step S130, it is determined for example whether or not the revolution number of motor generator MG2 is substantially zero regardless of the fact that torque command value Tqcom (2) has a predetermined value or more, and accordingly occurrence of the locked state can be detected. Alternatively, like Patent Document 3, the occurrence of the locked state may be detected based on the integral of the square of each phase motor current. In other words, the specific method for detecting the locked state in step S130 is not limited to a particular one.

In the case where the occurrence of the locked state is not detected in step S130 (determination is NO in step S130), control device 50 sets in step S140 voltage command value VHref for voltage step-up/step-down converter 15 to a maximum value of MG1 required voltage Vmg1 and MG2 required voltage Vmg2 calculated respectively in steps S110 and S120. Thus, except for the case where the locked state occurs, system voltage VH that is the output voltage of voltage step-up/step-down converter 15 can be set higher than the induced voltage of motor generators MG1, MG2. As a result, control device 50 can drive and control motor generators MG1, MG2 using inverters 20, 30 and following torque command values Tqcom (1), Tqcom (2).

In contrast, when the locked state occurs, current concentratedly and continuously flows in a specific phase of motor generator MG2 as described above. Therefore, there is the possibility that the switching loss of the switching device forming the arm corresponding to the specific phase increases to cause a sudden heat generation.

Therefore, when the locked state is detected (determination is YES in step S130), control device 50 sets in steps S150 and S160 voltage command value VHref for voltage step-up/step-down converter 15. In step S150, control device 50 sets limit voltage Vlmt of system voltage VH. Limit voltage Vlmt is set substantially equal to the output voltage (detected voltage Vb or output voltage rating) of running-purpose battery B (DC power supply).

Further, in step S160, control device 50 sets voltage command value VHref to the lower one of limit voltage Vlmt set in step S150 and the maximum voltage of required voltages Vmg1, Vmg2. In other words, voltage command value VHref is set equal to or smaller than limit voltage Vlmt to limit the voltage step-up of voltage step-up/step-down converter 15.

Thus, according to the first embodiment of the present invention, when the locked state of motor generator MG2 is detected, voltage command value VHref is set so that system voltage VH is set low, and accordingly switching loss Ploss of each switching device forming a part of inverters 20, 30 can be reduced. Consequently, the temperature increase of the switching device of a specific phase on which the current concentrates in inverter 130 can be suppressed. At this time, deterioration of the control performance or generation of audible noise is not caused, which is different from the power loss reduction by decreasing the switching frequency.

The setting of limit voltage Vlmt in step S150 is not limited to limit voltage Vlmt=Vb as long as the voltage step-up of voltage step-up/step-down converter 15 is suppressed as compared with the setting of the voltage command value in step S140. Thus, the effect of suppressing the temperature increase of the switching device as described above can be obtained. It should be noted that the maximum effect of suppressing the temperature increase as described above can be obtained by inhibiting the voltage step-up by voltage step-up/step-down converter 15 and setting system voltage VH to be substantially equal to battery voltage Vb while the limit voltage is set to Vlmt=vb.

In this way, the temperature increase of the switching device when the locked state occurs is suppressed to be gentle, so that the torque can be output from the electric motor (motor generator MG2) in the locked state for a longer period of time. Therefore, the hybrid vehicle generating the driving force by motor generator MG2 has improved vehicle performance. Alternatively, in consideration of the fact in advance that the temperature increase is made gentle when the locked state occurs under severe operating conditions, the switching device may be designed to have a low temperature resistance so that the size and cost of the switching device can be reduced.

In the first embodiment, step S130 in FIG. 2 corresponds to "lock detecting means" of the present invention, and steps S150, S160 correspond to "voltage limiting means" of the present invention. Further, steps S110, S120, S140 correspond to "voltage setting means" of the present invention, step S120 corresponds to "first setting means" of the present invention, step S110 corresponds to "second setting means" of the present invention and step S140 corresponds to "third setting means" of the present invention.

Second Embodiment

According to the first embodiment, the increase in temperature of the switching device when the locked state occurs is made gentle so that it is ensured that the locked electric motor (motor generator MG2) can continuously output a requested torque for a longer period of time (namely the period of time for which the locked state can be continued).

However, in the locked state where a relatively high torque output is required while the vehicle is driving uphill for example, if the electric power is supplied only from the running-purpose battery B (DC power supply), the remaining charge of the running-purpose battery B will suddenly decrease. In this respect, the period of time for which the locked state can be continued could be restricted. Therefore, according to a second embodiment, a description will be given of a control structure for ensuring a certain amount of electric power generated by the electric generator even in the locked state and ensuring the period of time for which the locked state can be continued.

Figure 6:
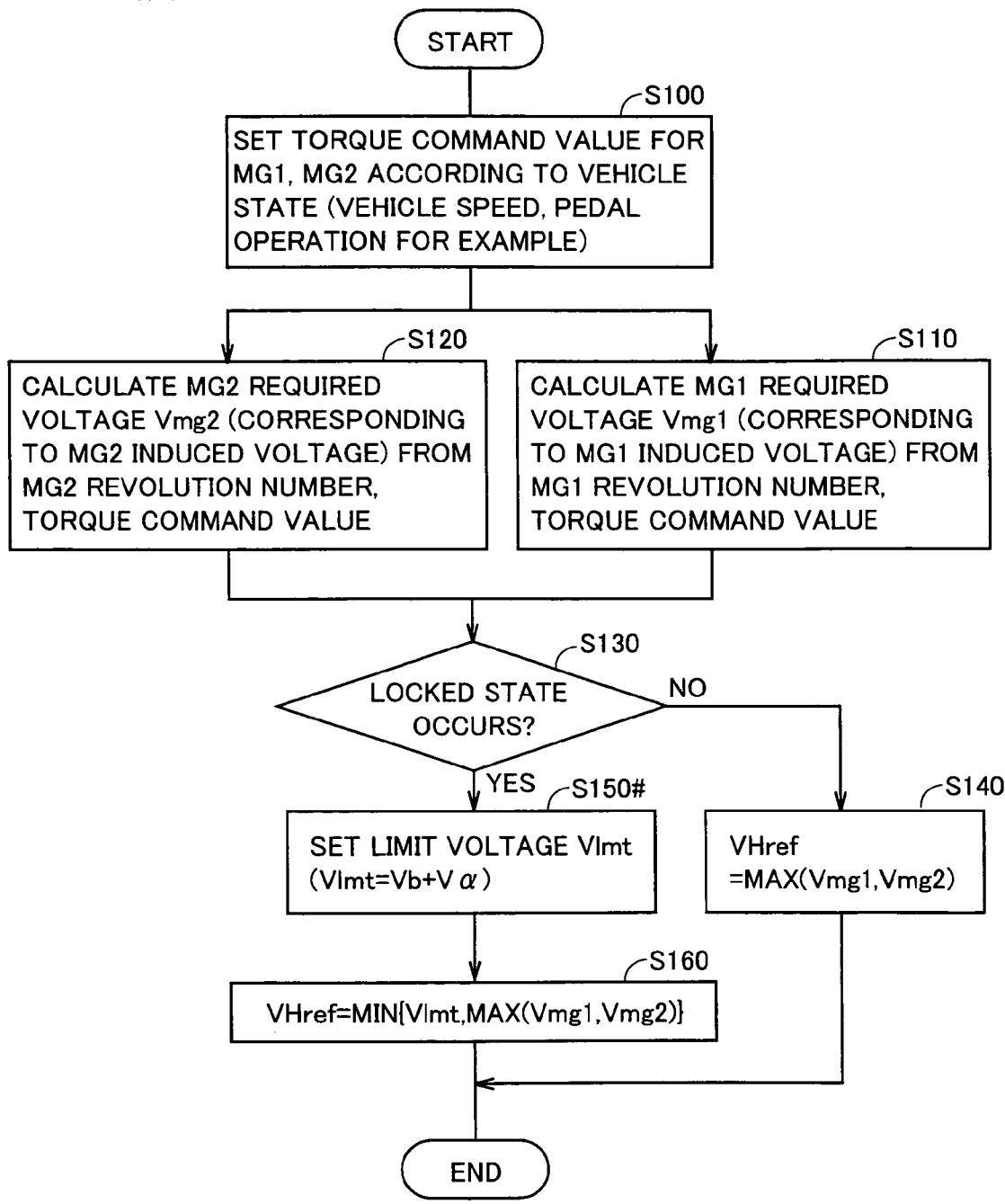
FIG. 6 is a flowchart illustrating a first example of setting a voltage command value for a voltage step-up/step-down converter according to a second embodiment of the present invention.

FIG. 6 is a flowchart illustrating a first example of the setting of the voltage command value (VHref) for voltage step-up/step-down converter 15 according to the second embodiment of the present invention. Regarding the program that follows the flowchart shown in FIG. 6 as well, it is supposed that the program is stored in ROM 52 in control device 50 and executed in predetermined cycles by control device 50 in hybrid vehicle 100 shown in FIG. 1.

FIG. 6 is compared with FIG. 2. For setting the voltage command value in a first example of the second embodiment, control device 50 performs the control process following the process including steps S100 to S160 shown in FIG. 2, in which step S150 is replaced with step S150#. Other details of the control process except for step S150# are similar to those in FIG. 2, and the detailed description thereof will not be repeated.

In step S150#, control device 50 sets limit voltage Vlmt of system voltage VH to Vlmt=Vb+Vα. Here, predetermined voltage Vα is set such that the switching loss of the switching device in inverter 30 which controls motor generator MG2 in the locked state can be suppressed to a certain degree and that motor generator MG1 can generate electric power. This predetermined voltage Vα may be a variable value according to the operational state (revolution number and/or torque command value) of motor generator MG1.

As a result, then the locked state of motor generator MG2 is detected, control device 50 sets in step S160 voltage command value VHref to limit voltage Vlmt (Vb+Vα) or less that is set in the above-described manner. Accordingly, when required voltage Vmg1 is higher than limit voltage Vlmt, although the increase of the voltage by voltage step-up/step-down converter 15 is limited similarly to the first embodiment, motor generator MG1 can generate electric power of an amount corresponding to predetermined voltage Vα.

Therefore, when the locked state of motor generator MG2 occurs, system voltage VH is set low like the first embodiment so as to achieve the effect of suppressing the temperature increase of the switching device in inverter 30, and to ensure a predetermined amount of electric power generated by motor generator MG1. Thus, the effect of suppressing the temperature increase of the switching device can be utilized to ensure the time for which the locked state can be continued, namely the period of time for which a requested torque of the electric motor (motor generator MG2) can be continuously output.

Figure 7:
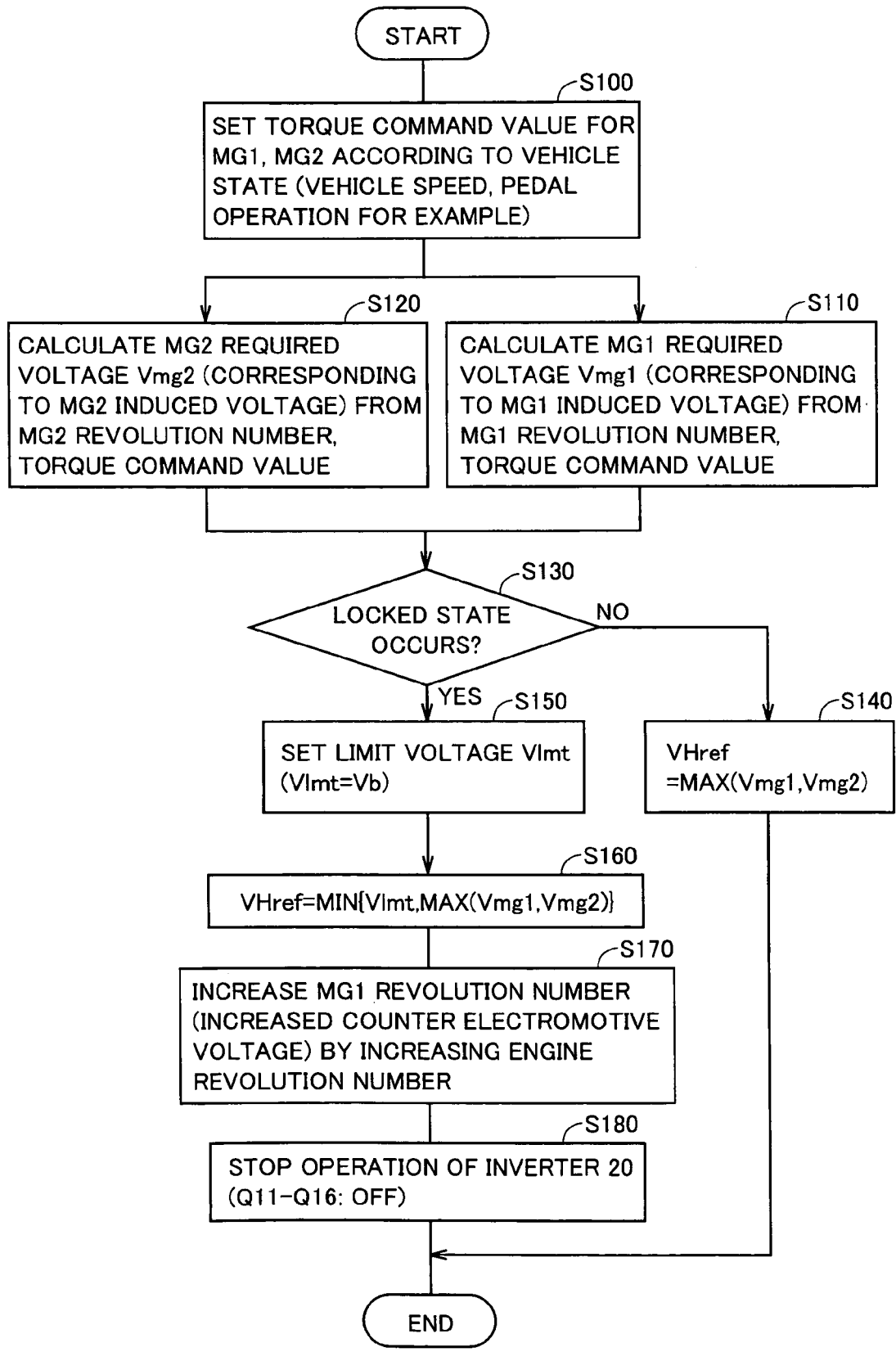
FIG. 7 is a flowchart showing a second example of setting the voltage command value for the voltage step-up/step-down converter according to the second embodiment of the present invention.

FIG. 7 is a flowchart illustrating a second example of the setting of the voltage command value (VHref) for voltage step-up/step-down converter 15 according to the second embodiment of the present invention. Regarding the program that follows the flowchart shown in FIG. 7 as well, it is supposed that the program is stored in ROM 52 in control device 50 and executed in predetermined cycles by control device 50 in hybrid vehicle 100 shown in FIG. 1.

FIG. 7 is compared with FIG. 2. For setting the voltage command value in the second example of the second embodiment, control device 50 performs the control process by further performing steps S170 and S180 when step S160 is executed, in addition to the process including steps S100 to S160 shown in FIG. 2. The control process including steps S100 to S160 is similar to that of FIG. 2, and the detailed description thereof will not be repeated.

In steps S150 and S160, control device 50 uses limit voltage Vlmt (Vlmt=Vb) as voltage command value VHref to inhibit the voltage step-up by voltage step-up/step-down converter 15 and accordingly limit system voltage VH to be equal to battery voltage Vb. Further, control device 50 performs steps S170 and S180 so that electric power can be generated by motor generator MG1.

In step S170, control device 50 increases the revolution number of motor generator MG1 by increasing the revolution number of the engine.

Figure 8:
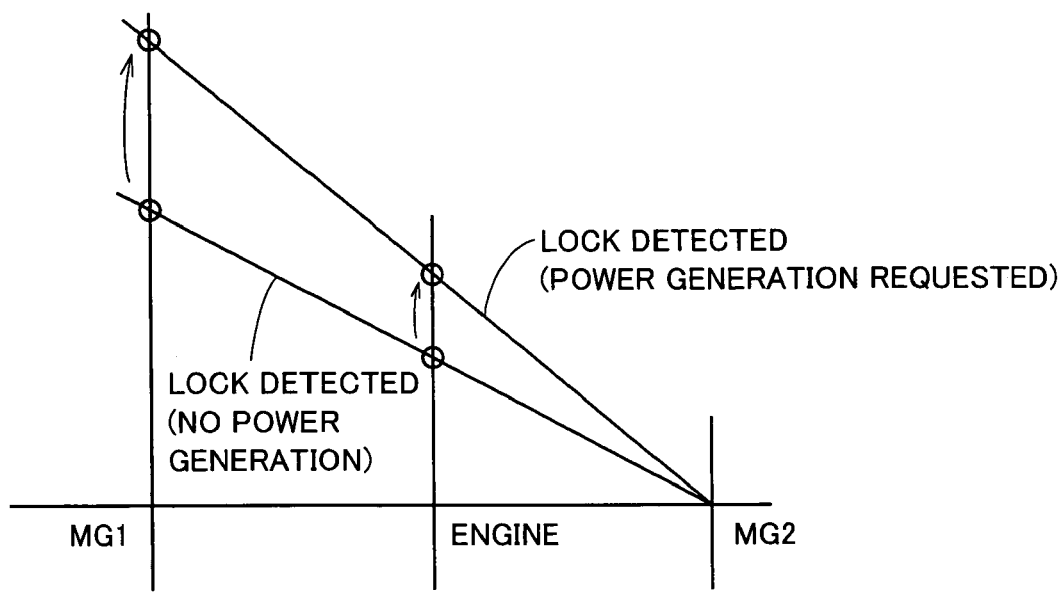
FIG. 8 is a nomograph illustrating control operation in step S170 of FIG. 7.

FIG. 8 is a nomograph illustrating the control operation in step S170. FIG. 8 shows a relation between the revolution numbers of motor generators MG1, MG2 and the engine connected via power split device 120, by means of the nomograph.

Referring to FIG. 8, motor generator MG2 in the locked state has a revolution number of substantially zero, and the revolution number of motor generator MG1 is determined according to the revolution number of the engine. When the voltage command value is set in the second example of the second embodiment, the process in step S170 is performed to increase the revolution number of the engine and thereby increase the revolution number of motor generator MG1. Thus, the counter electromotive force of motor generator MG1 increases so that the induced voltage is increased.

Referring again to FIG. 7, control device 50 in step S180 stops the operation of inverter 20 which drives and controls motor generator MG1. Namely, switching devices Q11 to Q16 are each turned off. In this state, motor generator MG1 is not allowed to generate electric power with a high efficiency under the inverter control. However, the increased induced voltage of motor generator MG1 can render antiparallel diodes D11, D13, D15 conductive so that an electric current path directing the counter electromotive force of motor generator MG1 from coil windings U1, V1, W1 to power supply 7 can be formed. Namely, antiparallel diodes D11, D13, D15 form "rectifying device" of the present invention.

Accordingly, although the recovery efficiency of the generated electric power deteriorates as compared with the case there the inverter control is performed, the amount of electric power generated using the counter electromotive force of motor generator MG1 can be ensured.

As a result, when the locked state of motor generator MG2 occurs, system voltage VH can be set low like the first embodiment to achieve the effect of suppressing the temperature increase of the switching device in inverter 30, and ensure a predetermined amount of electric power generated by motor generator MG1. Accordingly, the effect of suppressing the temperature increase of the switching device can be utilized to ensure the time for which the locked state can be continued.

In the second embodiment, step S150# in FIG. 6 and steps S170, S180 in FIG. 7 correspond to "power generation ensuring means" of the present invention.

Third Embodiment

In the hybrid vehicle, the case could occur where the locked state of motor generator MG2 occurs while the engine is stopped and further a request to start engine 110 is given. For example, the above-described case occurs when the remaining charge of running-purpose battery B decreases while the locked state continues and thus a request to charge is given, or when the extent to which the accelerator pedal is depressed by the driver (accelerator pedal depression) increases. In a third embodiment, a description will be given of how the above-describe case should be addressed.

Figure 9:
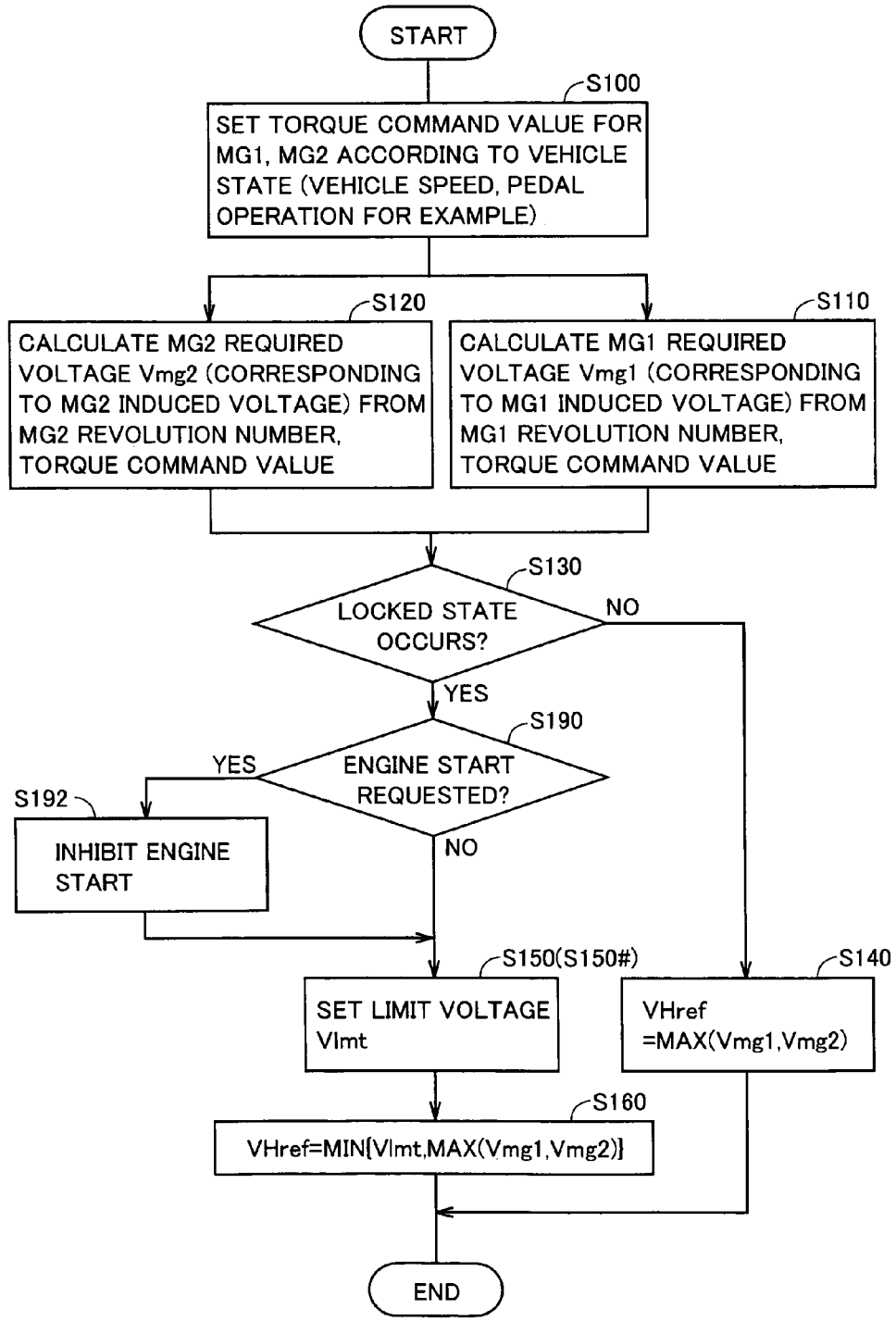
FIG. 9 is a flowchart illustrating vehicle control according to a third embodiment of the present invention.

FIG. 9 is a flowchart illustrating control of hybrid vehicle 100 according to the third embodiment of the present invention. Regarding the program that follows the flowchart shown in FIG. 9 as well, it is supposed that the program is stored in ROM 52 in control device 50 and executed in predetermined cycles by control device 50 in hybrid vehicle 100 shown in FIG. 1.

FIG. 9 is compared with FIG. 2. Under the vehicle control according to the third embodiment, control device 50 performs the control process for setting the voltage command value as shown in FIG. 2 and additionally performs the process of steps S190 and S192 when the determination in step S130 is YES, namely when the locked state is detected. Other details of the control process are similar to those of FIG. 2, and the detailed description thereof will not be repeated.

In step S190, control device 50 determines whether or not a request to start is made to engine 110 which is being stopped. In the case where the instruction to start the engine is given (the determination in step S190 is YES), control device 50 inhibits the start of the engine in step S192.

Then, after the process in step S192 control device 50 performs step S150 (or S150#) and step S160 to set voltage command value VHref for voltage step-up/step-down converter 15 so that system voltage VH does not exceed limit voltage Vlmt. In the case where the request to start the engine is not given (the determination in step S190 is NO), control device 50 similarly performs step S150 (or step S150#) and step S160 to set voltage command value VHref.

In general, in order to output torque for starting engine 110 by rotationally driving the engine which is being stopped, by motor generator MG1 that operates as "starting electric motor," it is necessary to increase battery voltage Vb to generate system voltage VH. Therefore, if the engine is started, the system voltage VH has to be increased, and consequently there is the possibility that the temperature at each switching device of inverter 30 driving and controlling locked motor generator MG2 will increase.

Therefore, the control structure as shown in FIG. 9 is used to limit, when the locked state is detected, system voltage VH while the engine start is inhibited even if the engine start request is given. Accordingly, when the locked state occurs while the engine is being stopped, the temperature increase of the switching device in inverter 30 driving motor generator MG2 can be surely suppressed.

Modification of the Third Embodiment

Figure 10:
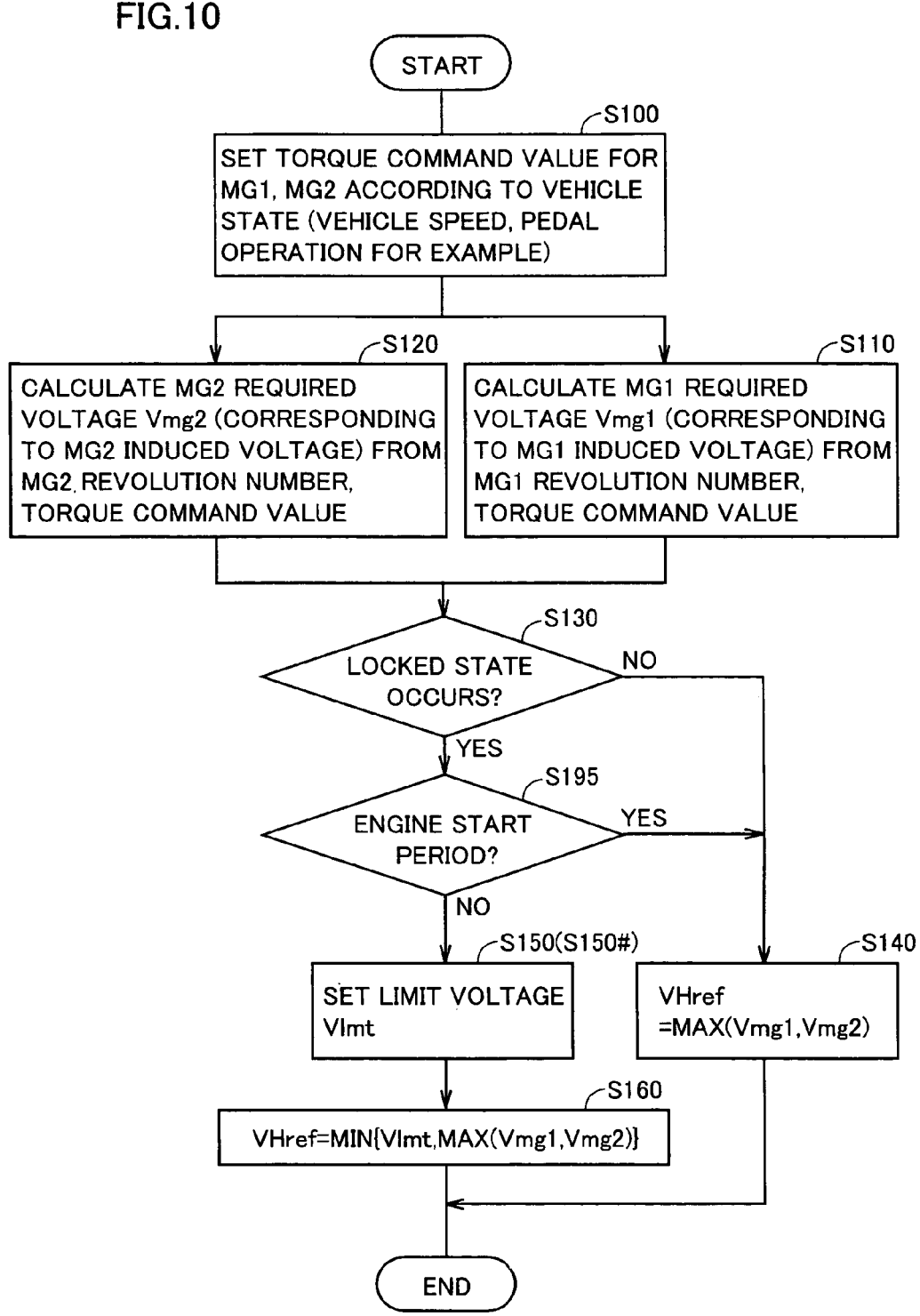
FIG. 10 is a flowchart illustrating vehicle control according to a modification of the third embodiment of the present invention.

FIG. 10 is a flowchart illustrating control of hybrid vehicle 100 according to a modification of the third embodiment of the present invention. Regarding the program following the flowchart shown in FIG. 10 as well, it is supposed that the program is stored in ROM 52 in control device 50 and executed in predetermined cycles by control device 50 in hybrid vehicle 100 shown in FIG. 1.

FIG. 10 is compared with FIG. 2. Under the vehicle control according to the modification of the third embodiment, in addition to the control process for setting the voltage command value as shown in FIG. 2, the process in step S195 is further performed when the determination in step S130 is YES, namely when the locked state is detected. Other details of the control process are similar to those in FIG. 2, and the detailed description thereof will not be repeated.

In step S195, control device 50 determines whether or not this is an engine start period from the time when a request to start the engine is given to the time when the engine start is completed. For example, the determination in step S195 can be made according to ON and OFF of a flag as provided that is rendered "ON" in response to issuance of the request to start the engine, and that is rendered "OFF" in response to the fact that the revolution number of engine 110 having been started by motor generator MG1 increases to become a predetermined engine revolution number or more.

Control device 50 performs step S150 (or S150#) and step S160 if it is not the engine start period (the determination in step S195 is NO), and sets voltage command value VHref for voltage step-up/step-down converter 15 such that system voltage VH does not exceed limit voltage Vlmt.

In contrast, in the engine start period (the determination in step S195 is YES), control device 50 performs step S140 to set voltage command value VHref so that required voltage Vmg1 of motor generator MG1 is ensured. Accordingly, generation is allowed of system voltage VH with which motor generator MG1 can be driven and control according to torque command value Tqcom (1) which is necessary to start the engine.

In this way, even when the locked state occurs while the engine is being stopped, the engine can be started and generally the temperature increase of the switching device in inverter 30 driving motor generator MG2 can be suppressed like the first embodiment.

Regarding the control according to the third embodiment that inhibits the engine start (FIG. 9) and the control according to the modification of the third embodiment ensuring the engine start (FIG. 10), the control structure for selectively performing the control depending on the nature of the engine start request may be used. For example, in the case where a request to start the engine is made according to a request to charge from running-purpose battery B, the control of the modification of the third embodiment (FIG. 10) is preferably performed to ensure the engine start so that the subsequent vehicle travel performance is ensured. In contrast, in the case where the request to start the engine is made according to an increase of the depression of the accelerator pedal by the driver, the control structure may be used in which the control in the third embodiment (FIG. 9) is performed to inhibit the engine start while reflecting the increase of the driving force request on the torque command value of motor generator MG2.

In the third embodiment and its modification, step S192 in FIG. 9 corresponds to "start limiting means" of the present invention, and step S195 in FIG. 10 corresponds to "start ensuring means" of the present invention.

Further, in the present embodiment, motor generator MG1 corresponds to "starting electric motor" of the present invention. However, it should be noted that, even if a starting electric motor used for starting the engine and supplied with electric power from power supply line 7 is separately provided, the vehicle control according to the third embodiment and its modification is applicable.

Fourth Embodiment

In connection with a fourth embodiment, a description will be given of motor generator control in the case where a stall state in which the driver operates both of the accelerator pedal and the brake pedal occurs and the thus the locked state of motor generator MG2 occurs.

Figure 11:
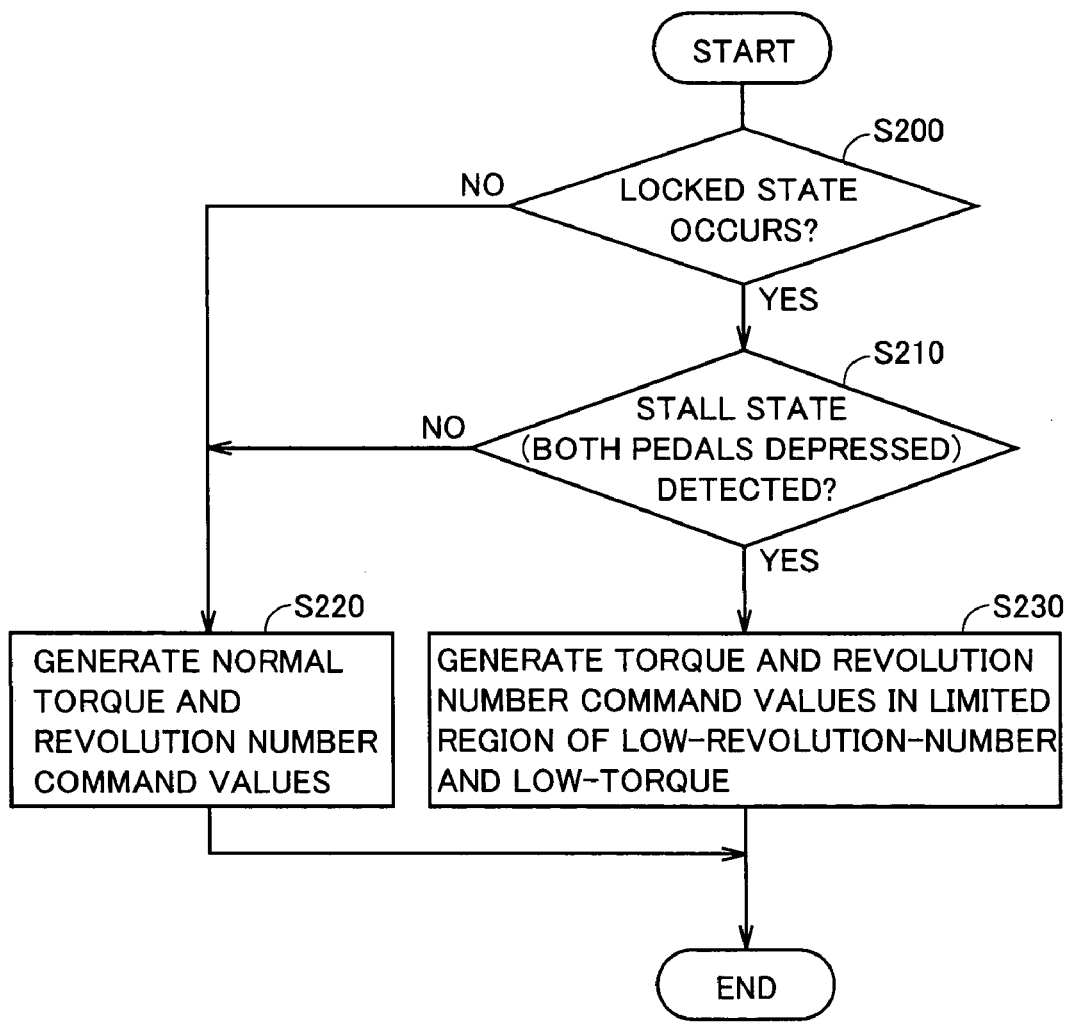
FIG. 11 is a flowchart illustrating vehicle control according to a fourth embodiment of the present invention.

FIG. 11 is a flowchart illustrating vehicle control according to the fourth embodiment of the present invention.

Referring to FIG. 11, control device 50 determines in step S200 whether or not the locked state of motor generator MG2 occurs by means of a process similar to the one in step S130 shown in FIG. 2 for example. When the locked state occurs (determination in step S200 is YES), control device 50 further performs step S210 to determine whether or not the stall state occurs. The determination in step S210 is performed based on signal ACC and signal BRK (FIG. 1). Control device 50 detects the stall state when respective extents to which accelerator pedal 70 and brake pedal 71 are depressed are not zero.

When the determination in step S200 or step S210 is NO, namely in the case where the locked state does not occur or the case where the stall state does not occur while the locked state occurs, control device 50 sets in step S220 the torque and revolution number for motor generators MG1, MG2 to normal torque and revolution number. Specifically, in the operational region (revolution number, torque) inside a maximum output line 250 shown in FIG. 12, torque command values Tqcom (1), Tqcom (2) for motor generators are generated according to the vehicle state, and respective revolution numbers of motor generators MG1, MG2 are set.

In contrast, when the locked state occurs (determination in step S200 is YES) and further the stall state is detected (determination in step S210 is YES), control device 50 performs step S230 to limit the operational region of motor generators MG1, MG2. In this case, the torque and the revolution number of motor generators MG1, MG2 are set in the limited range of a control region 260 (the operational region where revolution number$\leq$N0 and torque$\leq$T0) shown in FIG. 12. This limited region 260 is set according to the operational region where motor generators MG1, MG2 can be controlled without stepping up the voltage by voltage step-up/step-down converter 15 for example (namely required voltages Vmg1, Vmg2$\leq$rated battery voltage).

Figure 12:
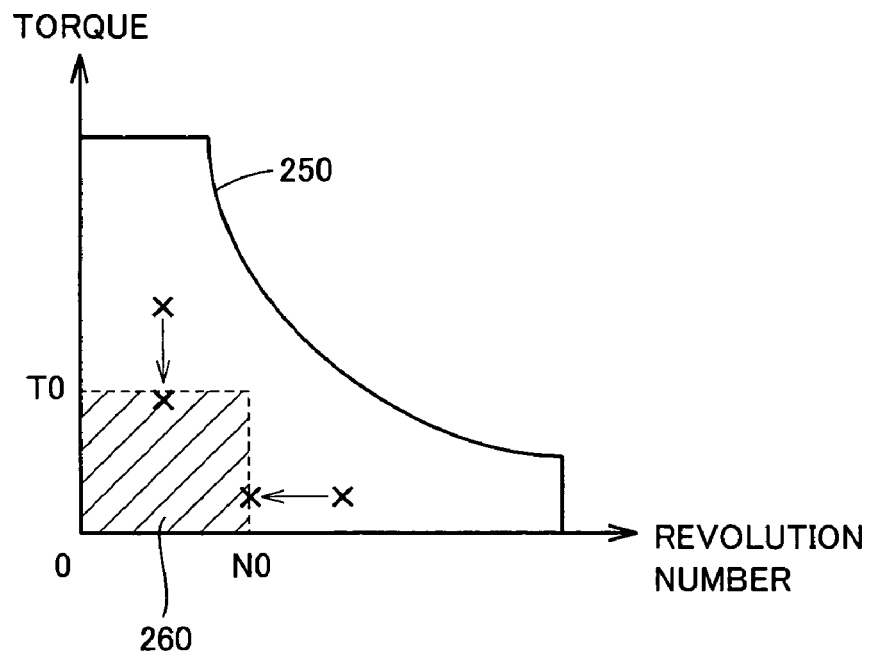
FIG. 12 is a schematic diagram showing an operational region of a motor generator.

As shown in FIG. 12, in the case where torque command values Tqcom (1), Tqcom (2) are larger than limit value T0, they are corrected to torque command value Tqcom (1)$\leq$T0 and/or Tqcom (2)$\leq$T0.

Figure 13:
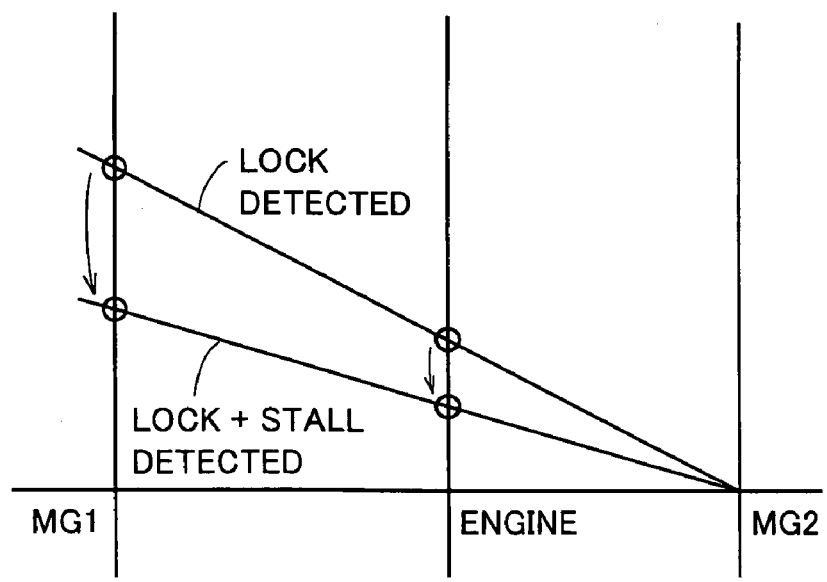
FIG. 13 is a nomograph illustrating an example of control operation in step S230 of FIG. 11.

Since motor generator MG2 is in the locked state, the revolution number thereof is substantially zero. In the case where the revolution number of motor generator MG1 exceeds limit value N0, the engine revolution number is decreased so that the revolution number of motor generator MG1 is lower than limit value N0, as shown by the nomograph in FIG. 13.

In the configuration as described above, when both of the locked state and the stall state occur, the operational region of motor generators MG1, MG2 is limited within the low-revolution-number and low-torque region, so that the switching loss of the switching devices forming inverters 20, 30 can be reduced and the temperature increase of the switching devices can be suppressed. Thus, the temperature increase of the switching device is made gentle and accordingly the torque can be output from the motor (motor generator MG2) in this state for a longer period of time.

As a result, the switching devices forming the inverter can be protected and the stall start performance can be ensured, and accordingly the vehicle performance can be improved. Alternatively, the switching device can be designed so that the temperature resistance of the switching device is low in consideration of the fact in advance that the temperature increase is made gentle when the locked state occurs in the vehicle that starts in the stall state, and thus the size and cost of the switching device can be reduced.

If the electric generator (motor generator MG1) is not mounted, the operational region may be limited according to the fourth embodiment only for the electric motor (motor generator MG2), so that both of the device protection and the stall start performance can be ensured by suppressing the temperature increase of the switching device.

In the fourth embodiment, step S210 in FIG. 11 corresponds to "stall detecting means" of the present invention, and step S230 corresponds to "operational region limiting means" of the present invention.

In connection with the present embodiment, the example is shown where the motor drive control system of the present invention is mounted on the hybrid vehicle. The application of the present invention, however, is not limited to this example. Specifically, the first, second and fourth embodiments, namely the embodiments except for the third embodiment and its modification directed to the engine start, are applicable to any electric vehicle such as electric car without engine, regardless of the number of rotating electric machines (electric motor, electric generator or motor generator) to be driven and controlled. Further, the first and second embodiments are applicable not only to the electric powered vehicle such as electric car or hybrid vehicle but also to an electric motor drive control system configured to include a converter capable of stepping up the output voltage of the DC power supply, regardless of the number of rotating electric machines (electric motor, electric generator or motor generator) and the drive load of the rotating electric machine (electric motor or motor generator).

It should be construed that embodiments disclosed above are by way of illustration in all respects, not by way of limitation. It is intended that the scope of the present invention is defined by claims, and includes all modifications and variations equivalent in meaning and scope to the claims.

The invention claimed is:

1. A motor drive control system comprising:
a DC power supply;
a converter configured to be able to step up an output voltage of said DC power supply and configured to variably control the output voltage of said DC power supply according to a voltage command value to output the output voltage to a DC power supply line;
an electric motor;
a first inverter performing electric power conversion, by means of a plurality of switching devices, between a DC power on said DC power supply line and an AC power for driving said electric motor such that said electric motor operates according to an operational command;
an electric generator configured such that the electric generator can be rotationally driven by an external force;
a second inverter performing electric power conversion, by means of a plurality of switching devices, between a DC power on said DC power supply line and an AC power for driving said electric generator such that said electric generator operates according to an operational command;
voltage setting means for setting said voltage command value for said converter according to respective operational states of said electric motor and said electric generator;
lock detecting means for detecting a locked state of said electric motor;
voltage limiting means for setting said voltage command value to lower one of said voltage command value set by said voltage setting means and a predetermined limit voltage when said lock detecting means detects said locked state; and
power generation ensuring means for supplying electric power from said electric generator to said DC power supply line when said lock detecting means detects the locked state of said electric motor.

2. The motor drive control system according to claim 1, wherein,
said voltage setting means includes:
first setting means for calculating said voltage command value that is to be set according to the operational state of said electric motor;
second setting means for calculating said voltage command value that is to be set according to the operational state of said electric generator; and
third setting means for setting said voltage command value for said converter to larger one of respective voltage command values calculated by said first setting means and said second setting means.

3. The motor drive control system according to claim 1, wherein
said power generation ensuring means sets said limit voltage such that electric power can be supplied from said electric generator to said DC power supply line when the locked state of said electric motor is detected.

4. The motor drive control system according to claim 1, wherein
said second inverter includes a rectifying device connected in parallel with said plurality of switching devices each such that electric power generated by said electric generator can be directed to said DC power supply line, and
when said lock detecting means detects said locked state, said power generation ensuring means turns off said switching devices each in said second inverter and increases rotational speed of said electric generator such that an amplitude of an AC voltage induced in said electric generator is larger than a voltage on said DC power supply line.

5. The motor drive control system according to claim 1, wherein
said motor drive control system is mounted on a vehicle including an engine operated by combustion of fuel,
said electric motor is configured to generate a driving force for said vehicle, and
said electric generator is configured to generate electric power by being rotationally driven by at least a part of an output of said engine, when said engine is operating.

6. The motor drive control system according to claim 5, further comprising:
stall detecting means for detecting a stall state in which both of an accelerator pedal and a brake pedal of said vehicle are operated; and
operational region limiting means generating, when said lock detecting means detects said locked state and said stall detecting means detects said stall state, an operational command value for said electric motor for limiting operational regions of said electric motor and said electric generator within a predetermined low-rotational-speed region and low-output-torque region.

7. A motor drive control system mounted on a vehicle, comprising:
a DC power supply;
a converter configured to be able to step up an output voltage of said DC power supply and configured to variably control the output voltage of said DC power supply according to a voltage command value to output the output voltage to a DC power supply line;
an electric motor configured to generate a driving force for said vehicle;
a first inverter performing electric power conversion, by means of a plurality of switching devices, between a DC power on said DC power supply line and an AC power for driving said electric motor such that said electric motor operates according to an operational command; and
lock detecting means for detecting a locked state of said electric motor, wherein
an engine operated by combustion of fuel and a starting electric motor supplied, from said DC power supply line, with a voltage higher than the output voltage of said DC power supply, for starting said engine are further mounted on said vehicle, and said motor drive control system further comprises start limiting means for limiting start of said engine when said lock detecting means detects the locked state of said electric motor.

8. The motor drive control system according to claim 7, wherein said starting electric motor is formed of a motor generator configured to be able to generate electric power by being rotationally driven by at least a part of an output of said engine, when said engine is operating, and to be able to start said engine by generating a torque for rotationally driving said engine, when said engine is stopping.

9. A motor drive control system mounted on a vehicle, comprising:

a DC power supply;

a converter configured to be able to step up an output voltage of said DC power supply and configured to variably control the output voltage of said DC power supply according to a voltage command value to output the output voltage to a DC power supply line;

an electric motor configured to generate a driving force for said vehicle;

a first inverter performing electric power conversion, by means of a plurality of switching devices, between a DC power on said DC power supply line and an AC power for driving said electric motor such that said electric motor operates according to an operational command; and lock detecting means for detecting a locked state of said electric motor, wherein an engine operated by combustion of fuel and a starting electric motor supplied, from said DC power supply line, with a voltage higher than the output voltage of said DC power supply for starting said engine are further mounted on said vehicle, and said motor drive control system further comprises start ensuring means for temporarily increasing said voltage command value for said converter to a required voltage of said starting electric motor only within a predetermined period of time required for starting said engine, when said lock detecting means detects said locked state and said engine is instructed to start.

10. A method for controlling a motor drive control system, said motor drive control system including:

a DC power supply;

a converter configured to be able to step up an output voltage of said DC power supply and configured to variably control the output voltage of said DC power supply according to a voltage command value to output the output voltage to a DC power supply line;

an electric motor;

a first inverter performing electric power conversion, by means of a plurality of switching devices, between a DC power on said DC power supply line and an AC power for driving said electric motor such that said electric motor operates according to an operational command;

an electric generator configured such that the electric generator can be rotationally driven by an external force; and a second inverter performing electric power conversion, by means of a plurality of switching devices, between a DC power on said DC power supply line and an AC power for driving said electric generator such that said electric generator operates according to an operational command, and said method comprising the steps of:

setting said voltage command value for said converter according to respective operational states of said electric motor and said electric generator;

detecting a locked state of said electric motor;

limiting said voltage command value to lower one of said voltage command value that is set according to the operational state of said electric motor and a predetermined limit voltage when said locked state is detected; and ensuring power generation by said electric generator such that electric power is supplied from said electric generator to said DC power supply line when the locked state of said electric motor is detected.

11. The method for controlling the motor drive control system according to claim 10, wherein said step of setting said voltage command value includes:

a first sub step of calculating said voltage command value that is to be set according to the operational state of said electric motor;

a second sub step of calculating said voltage command value that is to be set according to the operational state of said electric generator; and a third sub step of setting said voltage command value for said converter to larger one of respective voltage command values calculated by said first sub step and said second sub step.

12. The method for controlling the motor drive control system according to claim 10, wherein said step of ensuring power generation sets said limit voltage such that electric power can be supplied from said electric generator to said DC power supply line when the locked state of said electric motor is detected.

13. The method for controlling the motor drive control system according to claim 10, wherein said second inverter includes a rectifying device connected in parallel with said plurality of switching devices each such that electric power generated by said electric generator can be directed to said DC power supply line, and when the locked state of said electric motor is detected, said step of ensuring power generation turns off said switching devices each in said second inverter and increases rotational speed of said electric generator such that an amplitude of an AC voltage induced in said electric generator is larger than a voltage on said DC power supply line.

14. The method for controlling the motor drive control system according to claim 10, wherein said motor drive control system is mounted on a vehicle including an engine operated by combustion of fuel, and said electric motor is configured to generate a driving force for said vehicle, and said electric generator is configured to generate electric power by being rotationally driven by at least a part of an output of said engine, when said engine is operating.

15. The method for controlling the motor drive control system according to claim 14, further comprising the steps of:

detecting a stall state in which both of an accelerator pedal and a brake pedal of said vehicle are operated; and generating, when said locked state of said electric motor is detected and said stall state is detected, an operational command value for said electric motor for limiting operational regions of said electric motor and said electric generator within a predetermined low-rotational-speed region and low-output-torque region.

16. A method for controlling a motor drive control system mounted on a vehicle, said motor drive control system including:

a DC power supply;

a converter configured to be able to step up an output voltage of said DC power supply and configured to variably control the output voltage of said DC power supply according to a voltage command value to output the output voltage to a DC power supply line;

an electric motor configured to generate a driving force for said vehicle; and a first inverter performing electric power conversion, by means of a plurality of switching devices, between a DC power on said DC power supply line and an AC power for driving said electric motor such that said electric motor operates according to an operational command, an engine operated by combustion of fuel and a starting electric motor supplied, from said DC power supply line, with a voltage higher than the output voltage of said DC power supply, for starting said engine being further mounted on said vehicle, and said method comprising the steps of:

detecting a locked state of said electric motor; and limiting start of said engine when the locked state of said electric motor is detected.

17. The method for controlling the motor drive control system according to claim 16, wherein said starting electric motor is formed of a motor generator configured to be able to generate electric power by being rotationally driven by at least a part of an output of said engine, when said engine is operating, and to be able to start said engine by generating a torque for rotationally driving said engine, when said engine is stopping.

18. A method for controlling a motor drive control system mounted on a vehicle, said motor drive control system including a DC power supply;

a converter configured to be able to step up an output voltage of said DC power supply and configured to variably control the output voltage of said DC power supply according to a voltage command value to output the output voltage to a DC power supply line;

an electric motor configured to generate a driving force for said vehicle; and a first inverter performing electric power conversion, by means of a plurality of switching devices, between a DC power on said DC power supply line and an AC power for driving said electric motor such that said electric motor operates according to an operational command, an engine operated by combustion of fuel and a starting electric motor supplied, from said DC power supply line, with a voltage higher than the output voltage of said DC power supply, for starting said engine being further mounted on said vehicle, and said method comprising the steps of:

detecting a locked state of said electric motor; and temporarily increasing said voltage command value for said converter to a required voltage of said starting electric motor only within a predetermined period of time required for starting said engine, when the locked state of said electric motor is detected and said engine is instructed to start.

* * * * *